United States Patent [19]

Groce

[11] Patent Number: 4,902,037
[45] Date of Patent: Feb. 20, 1990

[54] KNEE RESTRAINT REMOVABLE FOR ENGINE SERVICE

[75] Inventor: James S. Groce, Utica, Mich.

[73] Assignee: General Motors Corporation, Detroit, Mich.

[21] Appl. No.: 258,427

[22] Filed: Oct. 17, 1988

[51] Int. Cl.$^4$ .............................................. B60R 21/04
[52] U.S. Cl. ................................. 280/751; 180/89.17
[58] Field of Search .............................. 280/751, 752; 180/69.24, 89.17

[56] References Cited

U.S. PATENT DOCUMENTS

| | | | |
|---|---|---|---|
| 3,198,543 | 8/1965 | Presunka | 280/751 |
| 3,840,248 | 10/1974 | Fiala | 280/748 |
| 3,907,326 | 9/1975 | Arntson et al. | 280/752 |
| 3,930,665 | 1/1976 | Ikawa | 280/752 |
| 4,421,343 | 12/1983 | Yoshitsusu et al. | 280/752 |
| 4,434,999 | 3/1984 | Sato | 280/752 |
| 4,723,792 | 2/1988 | Sakamoto et al. | 280/751 |
| 4,767,153 | 8/1988 | Kamasaki et al. | 280/752 |

FOREIGN PATENT DOCUMENTS 151227  11/1979  Japan ................................. 280/752

Primary Examiner—Kenneth R. Rice
Attorney, Agent, or Firm—Charles E. Leahy

[57] ABSTRACT

A knee restraint member is constructed to have an adjustable length and has ends adapted for respective attachment to the side panel structure of the vehicle body and to the engine cover panel. Removable fastening means removably attach the ends of the knee restraint member to the side panel structure and to the engine cover panel so that the knee restraint member may be disassembled from at least the engine cover panel to enable service of the engine. The adjustable length of the knee restraint member allows for variation in the distance between the side panel structure and the engine cover panel. In one embodiment of the invention the knee restraint member includes first and second elements, such as stamped steel panels having their inner ends connected together by a slotted connection so that the overall length of the knee restraint may be varied. In another embodiment the knee restraint member is a flexible belt of material having a length sufficient to span the maximum possible spacing between the side panel structure and the engine cover panel.

4 Claims, 2 Drawing Sheets

KNEE RESTRAINT REMOVABLE FOR ENGINE SERVICE

The invention relates to a knee restraint for a motor vehicle occupant restraint system and more particularly provides a knee restraint for a motor vehicle of the type having a removable engine cover projecting rearwardly into the passenger compartment of a vehicle.

BACKGROUND OF THE INVENTION

It is well known in motor vehicles that it is desirable to provide an occupant restraint system for restraining the occupant in the event of a rapid deceleration of the vehicle. In some cases, it is desirable to provide a knee restraint device which is engaged by the occupant's knees in the event of forward excursion of the occupant. Such knee restraints are commonly attached to the underside of the instrument panel.

The present invention relates to a knee restraint apparatus which is particularly suited for van type vehicles in which the engine compartment projects rearwardly into the passenger compartment so that the occupant's legs are positioned between the engine cover on the inboard side and the side structure of the vehicle body on the outboard side. The knee restraint apparatus in such a vehicle must close the space between the engine cover and the side structure and yet must permit the engine cover to be removed to enable servicing of the engine.

The present invention provides a new and improved knee restraint apparatus which is attached to the vehicle side structure and to the engine cover.

SUMMARY OF THE INVENTION

According to the invention, a knee restraint member is constructed to have an adjustable length and has ends adapted for respective attachment to the side panel structure of the vehicle body and to the engine cover panel. Removable fastening means removably attach the ends of the knee restraint member to the side panel structure and to the engine cover panel so that the knee restraint member may be disassembled from at least the engine cover panel to enable service of the engine. The adjustable length of the knee restraint member allows for variation in the distance between the side panel structure and the engine cover panel. In one embodiment of the invention the knee restraint member includes first and second elements, such as stamped steel panels having their inner ends connected together by a slotted connection so that the overall length of the knee restraint may be varied. In another embodiment the knee restraint member is a flexible belt of material having a length sufficient to span the maximum possible spacing between the side panel structure and the engine cover panel.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENTS

Figure 1:
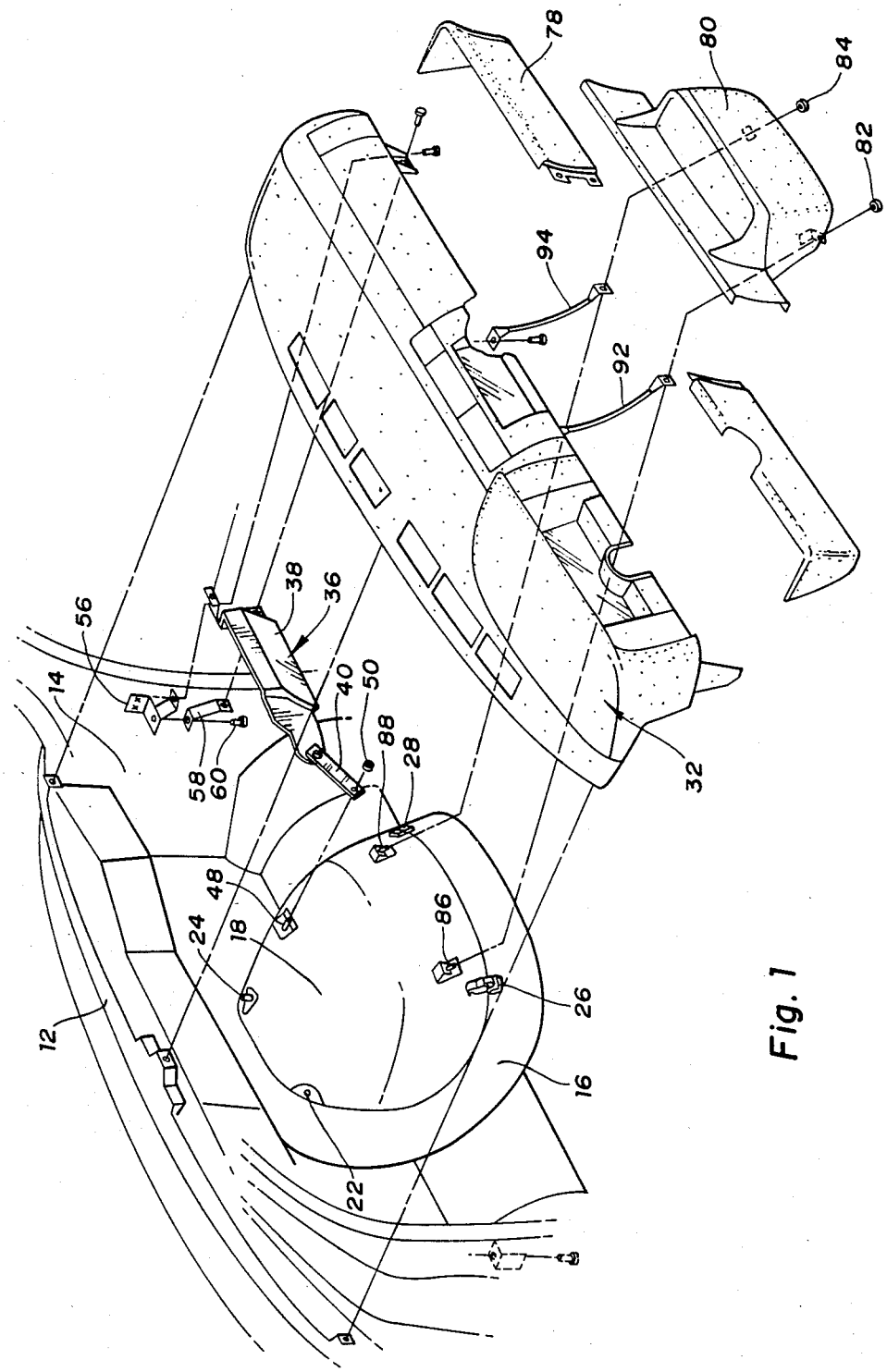
FIG. 1 is a perspective view of a vehicle body passenger compartment having a removable knee restraint member of adjustable length.

Referring to FIG. 1, there is shown a perspective view of a vehicle body passenger compartment which is defined by a forward bulkhead 12, a side panel structure 14, and an engine compartment housing 16 which projects rearwardly from the bulkhead 12 into the passenger compartment. The vehicle engine is concealed within the engine compartment housing 16 by an engine compartment cover panel 18. The engine compartment cover panel 18 is preferably a large molded plastic panel of complex shape and substantial size having its forward edge retained to the engine compartment housing 16 by nut and bolt assemblies 22 and 24. The rearward edge of the engine cover panel 18 is retained to the engine compartment housing 16 by a pair of toggle latches 26 and 28. By unlatching the toggle latches 26 and 28, and removing the nut and bolt assemblies 22 and 24, the engine cover panel 18 may be removed in order to expose the engine for inspection and maintenance.

An instrument panel assembly generally indicated at 32 is suitably mounted on the vehicle body, preferably by a plurality of bolts which extend into the bulkhead 12. The instrument panel assembly 32 carries the various vehicle controls and instruments as well as the heating and air conditioning controls and ducts. The instrument panel assembly 32 is comprised of a molded plastic cover which has various metallic reinforcing structures therein, in particular a channel shaped reinforcement extending along the bottom margin thereof to substantially stiffen the instrument panel assembly 32.

Figure 2:
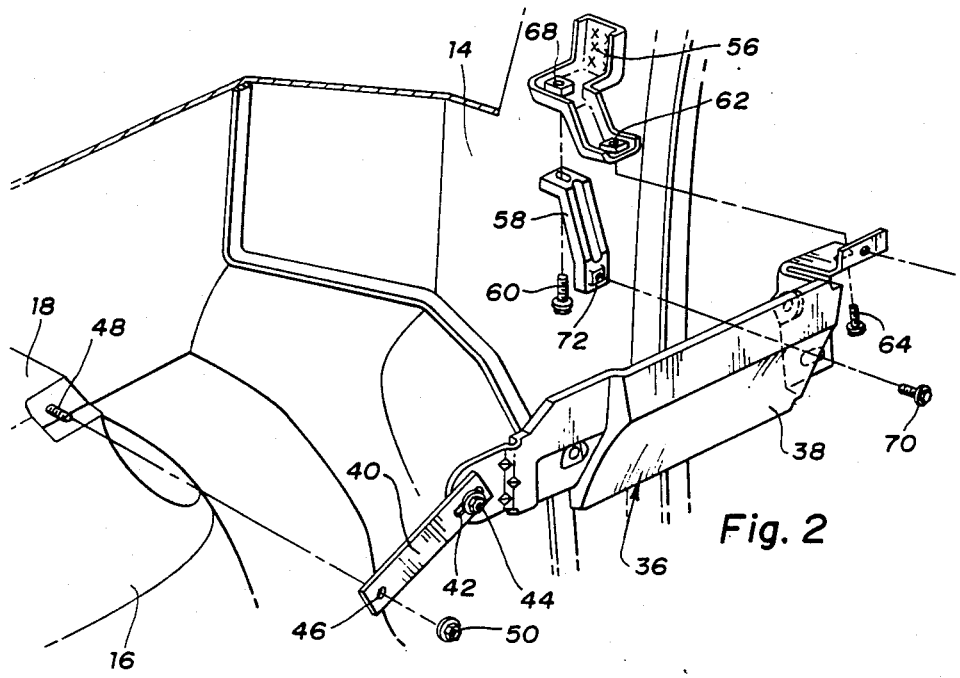
FIG. 2 is an enlarged view corresponding to the knee restraint member of FIG. 1.

A knee restraint assembly generally indicated at 36 is provided for the passenger. As best seen in FIG. 2, the knee restraint assembly 36 includes a knee restraint panel 38 and a strap 40 which are connected together end to end. The knee restraint panel 38 is a sheet metal stamping and extends across most of the space between the side panel structure 14 and the engine cover panel 18. The strap 40 is also a stamping, preferably of spring steel. The inner end of the strap 40 has a slot 42 which receives a nut and bolt assembly 44 extending through the inner end of the knee restraint panel 38. The outer end of the strap 40 has an aperture 46 which is adapted to fit over a threaded stud 48 carried by the engine cover panel 18. A nut 50 is threaded onto the threaded stud 48.

The outer end of the knee restraint panel 38 is attached to the side panel structure 14 by a mounting bracket 56 and an extension bracket 58. The mounting bracket 56, a sheet metal stamping, is welded to the side panel structure 14. The extension bracket 58 is also a sheet metal stamping and is attached to the mounting bracket 56 by a bolt 60 and weld nut 68. The outer end of the restraint panel 38 is connected to the mounting bracket 56 by a bolt 64 and weld nut 62. The lower part of the restraint panel 38 is attached to the extension bracket 56 by a bolt 70 and nut 72.

It will be appreciated that the substantial size of the engine cover 18, and its attachment to the engine compartment 16 by the toggle latches 26 and 28 may result in variation in the spacing between the threaded stud 48 carried by the engine panel cover 18 and the side panel structure 14 of the vehicle body. The knee restraint member comprised of the knee restraint panel 38 and the strap 40 is readily adjustable to accommodate such varied spacing by virtue of the adjustability provided by the slot 42. In addition, the spring steel strap 40 may be easily sprung forwardly or rearwardly somewhat to accommodate any fore and aft variation in the location of the threaded stud 48. Furthermore, it is understood that by merely removing the nut 50 from the threaded stud 48, the outer end of the strap 40 may be removed from the threaded stud 48 and the strap 40 then pivoted downwardly to enable the removal of the engine cover panel 18 for service of the engine without the necessity to completely dismantle the knee restraint assembly 36.

Referring again to FIG. 1, it is seen that a plastic decorative cover 78 is provided and fits overtop the restraint panel 38 and strap 40 to conceal the view thereof from within the passenger compartment. It is also shown in FIG. 1 that the center portion of the engine cover panel 18 is concealed behind a center cover 80 which is attached to the engine panel cover 18 by nuts 82 and 84 fitting respectively onto the threaded studs 86 and 88 of the engine cover panel 18. Furthermore, as seen in FIG. 1, cables 92 and 94 may extend between the engine cover panel 18 and the instrument panel 32 to hold the instrument panel downwardly against any tendency to be lifted upwardly when the occupant contacts with the knee restraint assembly 36.

Figure 3:
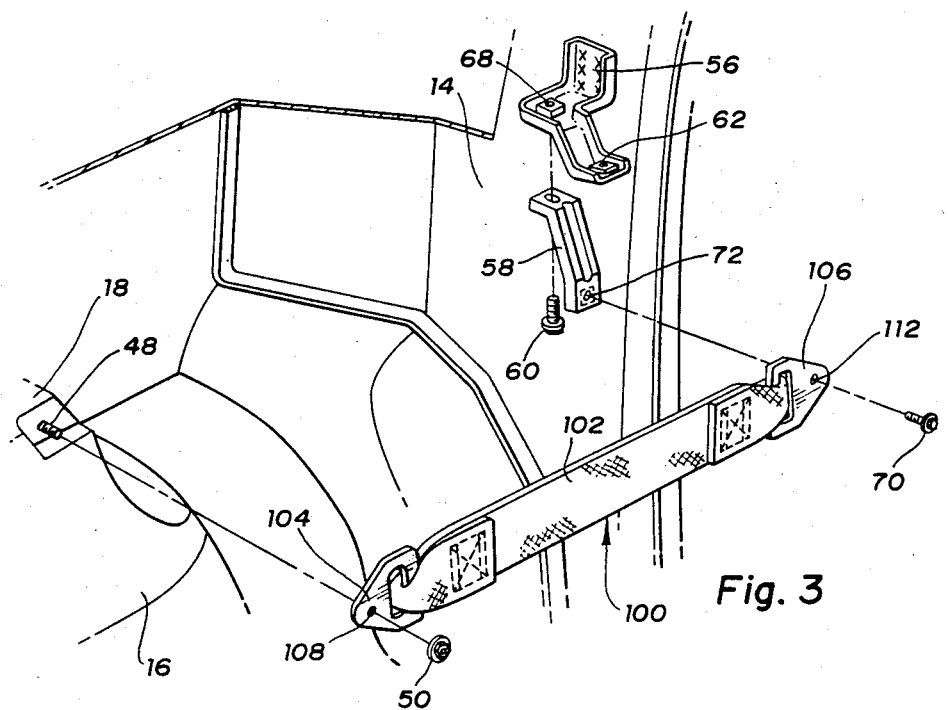
FIG. 3 is a view similar to FIG. 2 but showing a second embodiment in which the knee restraint member is comprised of a flexible belt of material.

Referring to FIG. 3, there is shown a second embodiment of the invention in which like elements are identified by the same numerals as used in FIGS. 1 and 2. The knee restraint assembly, generally indicated at 100, is comprised of a length of flexible belt 102, such as seat belt webbing. The ends of the flexible belt 102 extend through anchor plates 104 and 106 and sewn together. The inner anchor plate 104 has an aperture 108 to fit over the threaded stud 48 carried by the engine panel cover 18 so that the nut 50 attaches the inner end anchor plate 104 to the engine cover panel 18. The outer anchor plate 106 has a similar aperture 112 which receives bolt 70 to attach to the extension bracket 58.

The flexible belt 102 of FIG. 3 is provided in a length sufficient to span the distance between threaded stud 48 and the extension bracket 58 at the maximum distance therebetween. In the event that the engine cover panel as installed on a particular vehicle is closer than the maximum spaced length of the flexible belt 102, the flexible belt 102 will remain somewhat slackened but will nonetheless be effective to restrain the occupant's lower torso in the event of forward excursion of the occupant. The flexible belt 102 is concealed behind the decorative trim panel 78 as shown in FIG. 1.

Thus, the invention provides a new and improved knee restraint apparatus for a motor vehicle of the type having an engine cover panel projecting rearwardly into the passenger compartment. The knee restraint apparatus is readily removable, from at least the engine compartment cover to be removed for service of the engine. Furthermore, the length of the knee restraint member is adjustable to accommodate variation in the location of the engine cover panel.

The embodiments of the invention in which an exclusive property or privilege is claimed are defined as follows:

1. An occupant knee restraint apparatus for a motor vehicle of the type having an occupant knee space between a side panel structure of the vehicle body and an engine compartment protruding rearwardly into the passenger compartment and covered by an engine cover panel removable to enable service of the engine, comprising:
   a knee restraint member of adjustable length having ends adapted for respective attachment to the side panel structure of the vehicle body and to the engine cover panel;
   and removable fastening means removably attaching the ends of the knee restraint member to the side panel structure of the vehicle body and to the engine cover panel so that the knee restraint member may be disassembled from at least the engine cover panel to enable service of the engine.

2. An occupant knee restraint apparatus for a motor vehicle of the type having an occupant knee space between a side panel structure of the vehicle body and an engine compartment protruding rearwardly into the passenger compartment and covered by an engine cover panel removable to enable service of the engine, comprising:
   a knee restraint member including first and second elements having inner ends connected end to end by a slotted connection so that the overall length of the knee restraint member may be varied to adjust the length of the knee restraint member to establish the outer ends thereof to correspond to the spacing between the side panel structure of the vehicle body and the engine cover panel;
   and removable fastening means removably attaching the outer ends of the knee restraint member to the side panel structure of the vehicle body and to the engine cover panel so that the knee restraint member may be disassembled from at least the engine cover panel to enable service of the engine.

3. An occupant knee restraint apparatus for a motor vehicle of the type having an occupant knee space between a side panel structure of the vehicle body and an engine compartment protruding rearwardly into the passenger compartment and covered by an engine cover panel removable to enable service of the engine, comprising:
   a knee restraint member including a flexible belt of material having first and second ends adapted for respective attachment to the side panel structure of the vehicle body and to the engine cover panel, said flexible belt having a length sufficient to span the maximum possible spacing between the side panel structure of the vehicle body and the engine cover panel and being somewhat slackened in the event that the spacing is less than the maximum spacing to thereby adjust to the length of the knee restraint member to correspond to the spacing between the side panel structure of the vehicle body and the engine cover panel;
   and removable fastening means removably attaching the ends of the knee restraint member to the side panel structure of the vehicle body and to the engine cover panel so that the knee restraint member may be disassembled from at least the engine cover panel to enable service of the engine.

4. The knee restraint apparatus of claim 3 in which the flexible belt is a seat belt webbing and has apertured anchor plates attached to the end thereof and the removable fastening means includes nut and bolt assemblies attaching the anchor plates to the side panel structure and the engine cover panel.

* * * * *